Aug. 26, 1924.

N. E. G MEIJER

AUTOMATIC BOMB DROPPING APPARATUS FOR AEROPLANES, AIRSHIPS, AND OTHER AIRCRAFT

Filed Jan. 16, 1924    3 Sheets-Sheet 1

1,506,192

Inventor
N. E. G. Meijer
By Marks & Clerk
Attys.

Aug. 26, 1924.

N. E. G MEIJER 1,506,192

AUTOMATIC BOMB DROPPING APPARATUS FOR AEROPLANES, AIRSHIPS, AND OTHER AIRCRAFT

Filed Jan. 16, 1924    3 Sheets-Sheet 2

Inventor
N.E.G.Meijer
By Marks & Clerk
Attys

Patented Aug. 26, 1924.

1,506,192

UNITED STATES PATENT OFFICE.

NICOLAAS EVERHARD GROENEVELD MEIJER, OF SOERABAJA, DUTCH EAST INDIES.

AUTOMATIC BOMB-DROPPING APPARATUS FOR AEROPLANES, AIRSHIPS, AND OTHER AIRCRAFT.

Application filed January 16, 1924. Serial No. 686,625.

*To all whom it may concern:*

Be it known that I, NICOLAAS EVERHARD GROENEVELD MEIJER, a subject of the Queen of the Netherlands residing at Soerabaja, Dutch East Indies, have invented certain new and useful Improvements in Automatic Bomb-Dropping Apparatus for Aeroplanes, Airships, and Other Aircraft, of which the following is a specification.

My present invention relates to automatic bomb dropping apparatus for aeroplanes, air ships and other aircraft and has for its principal object an apparatus which ensures release of the bomb in exactly the proper moment for hitting the target, without the operator having to do anything but sighting the target during a relatively short period after having properly adjusted the apparatus.

Figure 1:
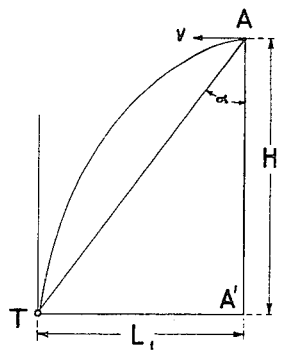
Figure 2:
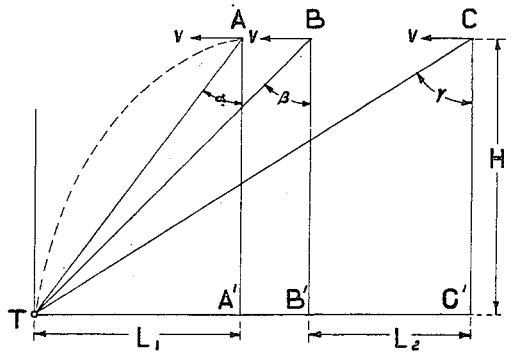
Figure 5:
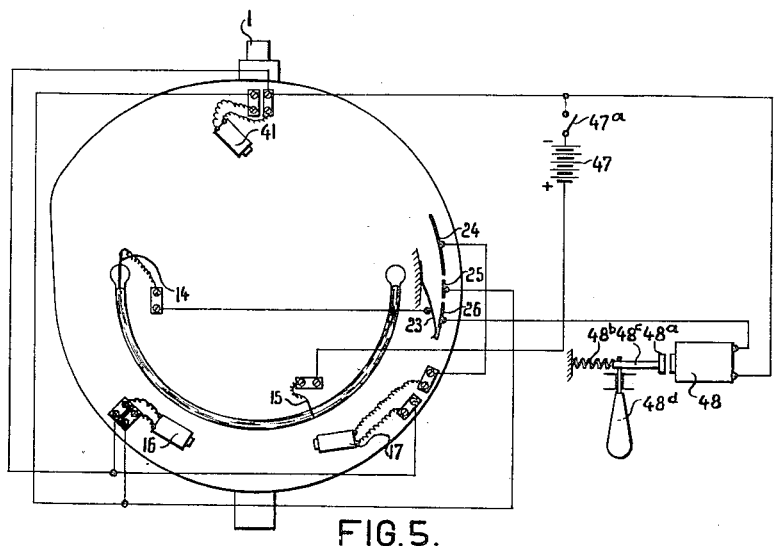
Figure 7:
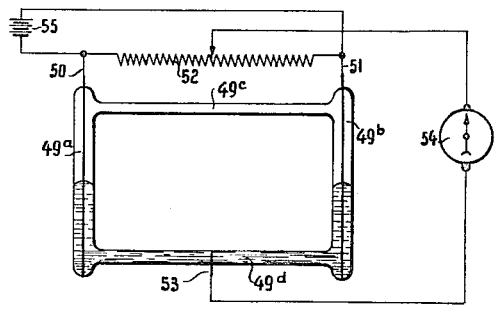
Figure 3:
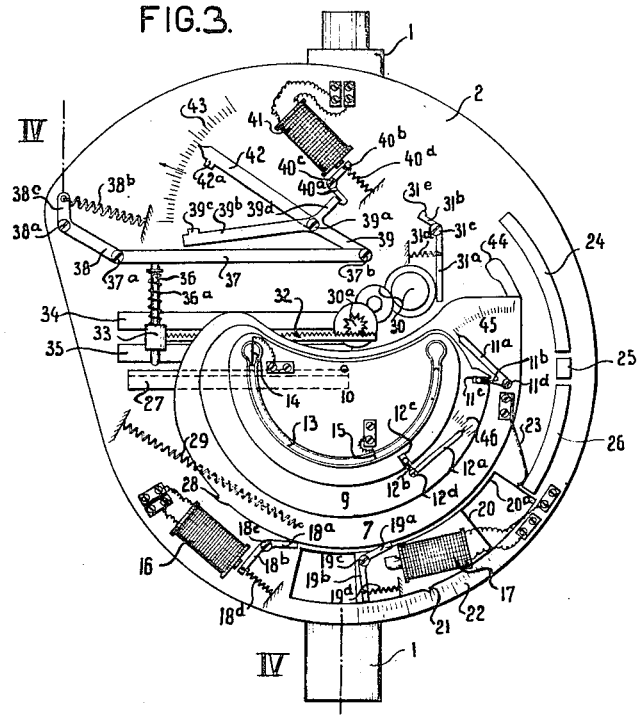
Figure 4:
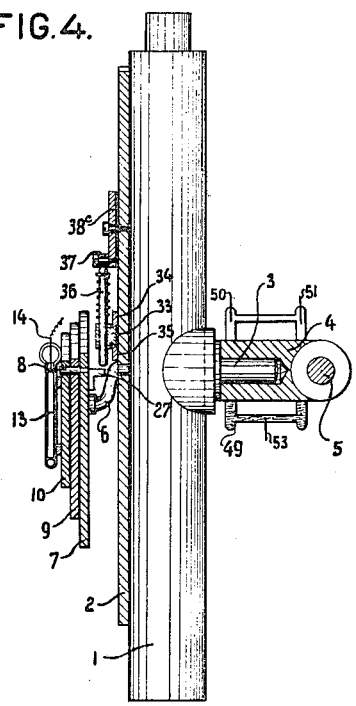
Figure 6:
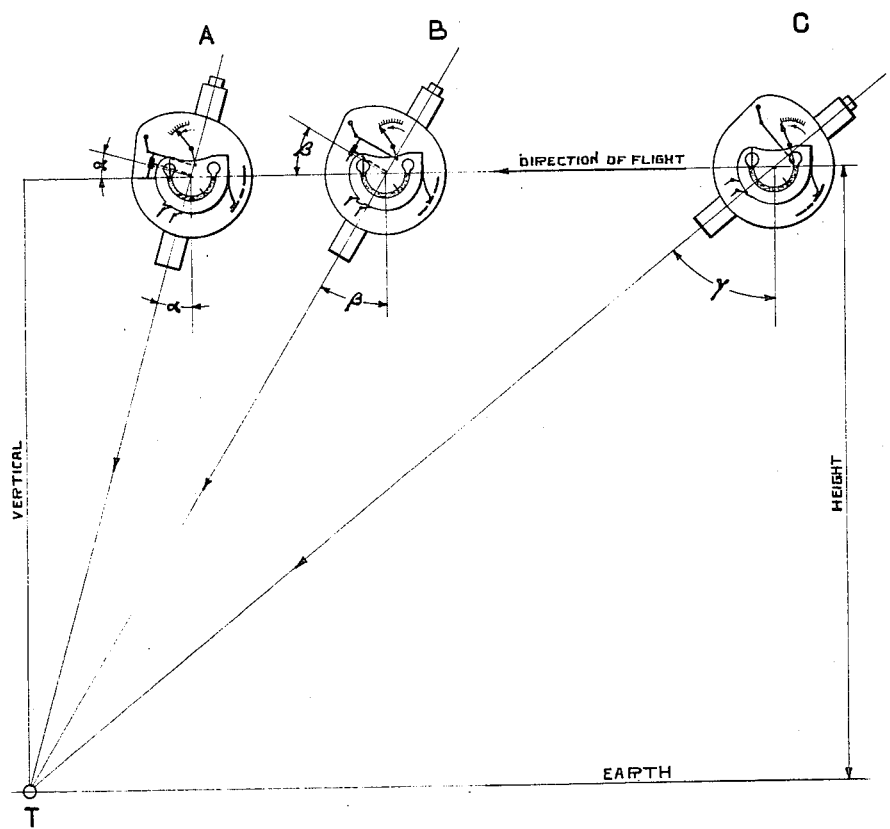

In order that my said invention may be clearly understood I shall first explain the theory which forms the base of the construction and operation of the apparatus, reference being had to the annexed drawing on which:

Figures 1 and 2 are diagrams for explaining the theory,

Figure 3 is a front elevational view of one convenient embodiment of my invention, Figure 4 is a cross sectional view along the line IV—IV in Figure 3, Figure 5 illustrates the electric wiring diagram of the apparatus, Figure 6 shows the apparatus in three successive positions, the sighting telescope being constant'y pointed at the target, and Figure 7 shows auxiliary means for ensuring that the air craft remains constantly in one definite perpendicular plane passing through the target.

Referring now to Figure 1, suppose a bomb, dropped from an aeroplane in A, to reach the surface of the earth in T, the distance from T to $A_1$ (the vertical projection of A) being $L_1$ and the altitude or height of the aeroplane being H. The distance $L_1$ depends primarily upon the horizontal speed $v$ of the aeroplane relative to the surface of the earth (absolute horizontal speed) and upon the altitude H. The speed of the aeroplane relative to the surrounding air and the ballistic properties of the bomb are factors of secondary importance and will here be disregarded.

From Figure 1 it follows that the angle of throw $\alpha$ is determined by the equation $$\tan \alpha = \frac{L_1}{H}$$

Said angle is the angle between the vertical and the sight line at the moment wherein the bomb should be released in order that it may hit the target.

The time of fall $t$ of the bomb is determined by the equation $$t = \sqrt{\frac{2 \cdot H}{a}}$$

in which $a$ denotes the acceleration of gravity.

Furthermore, $$L_1 = vt = v\sqrt{\frac{2 \cdot H}{a}}$$

As to the absolute horizontal speed $v$ of the aeroplane, this can be determined by sighting a given point on the surface of the earth (which point may be the target itse'f) under two different angles and reading the time interval $t_1$ between these two observations. Referring to Figure 2, C, B and A are three different positions of the aeroplane at an unvariable altitude H during its flight in a vertical plane passing through the target T, the horizontal projections of these points being $A_1$, $B_1$ and $C_1$, respectively, whereas distance $A_1T=L_1$ and distance $B_1C_1=L_2$. When angles $TAA_1$, $TBB_1$ and $TCC_1$ are denoted by $\alpha$, $\beta$ and $\gamma$ respectively, and the time required for the aeroplane to fly from C to B by $t_1$, the horizontal distance $L_2$ is determined by the equation $$L_2 = H(\tan \gamma - \tan \beta)$$

and the absolute horizontal speed of the aeroplane by $$v = \frac{L_2}{t_1} = \frac{H(\tan \gamma - \tan \beta)}{t_1}$$

If $f_1$ is a given constant, and $t$ again denotes the time of fall for a given altitude, the angles γ and β can obviously always be chosen so that $$L_2 = f_1 t$$

for that particular altitude. Consequently:

$$v = f_1 \frac{t}{t_1}$$

Moreover:

$$L_1 = v \cdot t = f_1 \frac{t^2}{t_1}$$

so that $$\text{tang. } \alpha = \frac{L_1}{H} = f_1 \frac{t^2}{H \cdot t_1}$$

and seeing that $$t = \sqrt{\frac{2 \cdot H}{a}}$$

it follows that $$\text{tang. } \alpha = \frac{2 f_1}{a} \cdot \frac{1}{t} = \frac{f_2}{t_1} \quad (I)$$

wherein $f_2$ denotes a constant.

From formula (I) it follows that, assuming the horizontal distance $L_2$ to be a given multiple of the time of fall $t$, the angle of throw $\alpha$ exclusively depends upon the time $t_1$ to which it is inversely proportional.

Assuming the angles γ and β to have fixed values, it is obvious that in this case distance $L_2$ is direct proportional to the altitude H, so that $$L_2 = f_3 \cdot H$$

$f_3$ being a constant.

If now the time required for the aeroplane to cover the distance CB is denoted by $t_2$, the absolute horizontal speed $v$ is determined by $$v = \frac{L_2}{t_2} = \frac{f_3 \cdot H}{t_2}$$

The horizontal distance $L_1$ covered by the bomb after being released is determined by:

$$L_1 = v \cdot t = \frac{f_3 \cdot H \cdot t}{t_2}$$

so that $$\text{tang. } \alpha = \frac{L_1}{H} = \frac{f_3 \cdot t}{t_2}$$

Seeing that $$t = \sqrt{\frac{2 \cdot H}{a}}$$

it follows that $$\text{tang. } \alpha = \frac{f_3 \sqrt{\frac{2}{a}} \cdot \sqrt{H}}{t_2}$$

in which $$f_3 \sqrt{\frac{2}{a}}$$

is a constant to be denoted by $f_4$. Consequently $$\text{tang. } \alpha = \frac{f_4 \sqrt{H}}{t_2} \quad (II)$$

From formula II it follows that, when the horizontal distance $L_2$ is direct proportional to the altitude H, the tangent of the angle of throw α is direct proportional to the root of the altitude and inversely proportional to the time lapsed between sighting the target under two predetermined angles.

Having now explained the theory upon which the operation of my novel instrument is based, I shall proceed to describe the preferred construction with reference to Figures 3 and 4 of the drawing. In these figures, 1 is a suitable sighting telescope secured to a disc 2. The telescope is provided with a trunnion 3 at right angles to the line of sight, the bearing 4 of said trunnion being rotatably mounted upon a pivot 5 disposed at right angles to the axis of trunnion 4 and in parallel relation with the longitudinal axis of the aeroplane.

In alignment with the axis of trunnion 3 disc 2 has a bearing for an arm 6, attached to which is a substantially semi-circular plate 7 provided with a laterally projecting pin 8 in alignment with the axis of trunnion 3 and serving as a pivot for two substantially semi-circular plates 9 and 10.

Rotatably mounted on a laterally extending pin 11$^d$ of plate 7 is a bell crank lever, one arm of which, designated by 11$^a$, cooperates as a pointer with a graduated dial 45 on plate 7, the other arm 11$^b$ projecting into a notch 11$^c$ of plate 9 in such a manner, that the angular position of plate 9 relative to plate 7 can accurately be adjusted. In a similar manner the angular position of plate 10 can be adjusted relative to plate 9 by means of a bell crank lever, which is pivoted to plate 9 as at 12$^d$, one arm of said lever, designated by 12$^a$, cooperating as a reader with a graduated dial 46 on plate 9, the other arm, 12$^b$, projecting into a notch 12$^c$ of plate 10.

Secured to plate 10 is an evacuated semi-circular glass tube 13, closed at both ends and partly filled with mercury. Both in its central portion and at its left hand end tube 13 is provided with contacts 15 and 14, respectively, which project into the path of the mercury, in such a manner that contact 15 is always partly immersed, whereas contact 14 just engages the surface of the mercury when the axis of symmetry of tube 13 is vertical.

Mounted on disc 2 are two electromagnets 16 and 17. The armature of electromagnet 16 forms a bell crank lever pivoted as at 18$^c$ and having one of its arms, 18$^b$, attached to a retracting spring 18$^d$, whereby the other arm 18$^a$ is normally kept pressed against the periphery of plate 7. Similarly, the armature of electromagnet 17 is formed by a bell crank lever having its pivot in 19$^c$ and one arm of which, designated by 19$^b$, is loaded by a retracting spring 19$^d$ tending to hold the other arm 19$^a$ in engagement with the periphery of plate 7. Magnet 16 and pivot $18^e$ of its armature are secured to disc 2, but magnet 17 and its armature are mounted on a slide 20 adapted to be displaced relative to disc 2 in a circular guideway $20^a$, the centre of curvature of which coincides with the axis of trunnion 3. Slide 20 has a reader 21 cooperating with a graduated dial 22 on disc 2. Plate 7 is provided with a peripheral cam face 28 adapted for coaction with the arms $18^a$ and $19^a$, and is loaded by a coil spring 29 attached to disc 2 so as to tend to swing plate 7 in clockwise direction.

An insulated spring blade 23, attached to plate 7, is arranged to move over insulated contact segments 24, 25 and 26 secured to disc 2, when said plate and said disc are angularly displaced the one relative to the other.

The back side of plate 7 is provided with a rail 27, the upper face of which passes through the axis of trunnion 3.

A clockwork 30, mounted on disc 2, is normally arrested by one arm $31^a$ of a bell crank lever pivoted to disc 2 as at $31^c$ and loaded by a spring $31^d$ which tends to move it into its arresting position. The second arm $31^b$ of the said bell crank lever has a cam $31^e$ in the circular path of a cam 44 on plate 7. One of the pinions, $30^a$, of the clockwork meshes with a rack 32 provided with a sliding block 33 movable between two guideways 34 and 35 disposed on disc 2 at right angles to the axis of the telescope 1. The sliding block 33 has a bore hole in parallel relation with the axis of the telescope and serving to guide a pin 36 which, under the influence of a light spring $36^a$, always tends to assume its highest position.

A rod 37, adapted to push pin 36 downward, is hinged at both ends, $37^a$ and $37^b$, to the ends of two parallel lever arms 38 and 39, respectively, of equal lengths and pivoted to disc 2 as at $38^a$ and $39^a$, respectively, in such a manner that rod 37 always remains at right angles to the axis of the telescope. A spring $38^b$, engaging an arm $38^c$ of lever 38, tends to force rod 37 downwards.

Lever 39 is provided with an arm $39^b$ having an abutment $39^c$, and with an arm $39^d$ coacting with a pawl $40^a$, Said pawl forms one arm of a bell crank lever pivoted to disc 2 as at $40^c$, the second arm, $40^b$, forming the armature of an electromagnet 41 secured to disc 2. A spring $40^d$ normally retracts armature $40^b$ from the core of its magnet so as to lock arm $39^d$.

Mounted on pivot $39^a$ is a pointer 42, cooperating with a graduated dial 43 on disc 2 and provided with an abutment $42^a$ in the circular path of abutment $39^c$ around pivot $39^a$.

Figure 5 shows the wiring diagram of the described arrangement, 47 being a battery, $47^a$ a switch, 48 an electromagnet. The armature $48^a$ of said magnet is connected to a retracting spring $48^b$ and provided with a pin $48^c$, suspended from which is the bomb $48^d$ in such a manner as to be instantaneously released when magnet 48 is energized.

As shown, contact 15 is connected with the $\div$ pole of battery 47, the $-$ pole of which is connected (a), across magnet 48, with contact segment 26, (b), across magnets 41 and 16, with contact segment 25, and (c), across magnet 17, with contact segment 24.

The modus operandi of the instrument is as follows, it being assumed that the absolute horizontal speed of the aeroplane is measured through a distance $L_2$ which is a given multiple of the time of fall $t$ of the bomb for the particular altitude at which the aeroplane is flying, see formula I.

I first adjust slide 20 in such a manner that its reader 21 indicates on dial 22 the actual altitude of the aeroplane. In this connection it should be understood that the graduations of dial 22 properly indicate times of fall, but as these times exclusively depend upon the altitudes I mark said dial in such a manner as to permit to directly read the altitudes. If desired, both the times of fall and the corresponding altitudes may be marked on said dial.

Next I place pointer 42 opposite the index $St$ of dial 43 and I adjust the relative angular positions of plates 7, 9 and 10 by means of the pointers $11^a$ and $12^a$, which are set in accordance with the reading of a thermometer and with the ballistic properties of the bomb, respectively, having regard to the speed of the aeroplane relative to the surrounding air.

Thereupon I turn disc 7 by hand in a counter clockwise direction until its cam face 28 is locked by arm $19^a$, I place sliding block 33 centrally with respect to disc 2, and I wind up the clockwork 30 which, however, is arrested by lever $31^a$. The apparatus is now ready for use.

When the aeroplane approaches the object T to be hit by the bomb (see Figure 6) the observer closes switch $47^a$ and points the telescope (and from that moment onward keeps it constantly pointed) at the target. The moment wherein the axis of the telescope makes an angle $\gamma$ with the vertical, that is to say when the aeroplane is in C, contact 14 will close the following circuit: $\div$ of battery 47, contact 15, mercury in tube 13, contact 14, contact spring 23, contact segment 24, magnet 17, $-$ of battery 47. Magnet 17 is energized and attracts its armature, whereby plate 7 is released and pulled by spring 29 in a clockwise direction until cam 28 is again arrested by pawl $18^a$. In this position of plate 7 relative to disc 2, cam 44 engages cam $31^e$ so as to move arresting lever $31^a$ into its inoperative position, so that the clockwork 30 begins to run, thereby driving sliding block 33 at a uniform speed to the left.

When, after a certain time, the aeroplane assumes position B and the axis of the telescope makes an angle β with the vertical, contact 14 again engages the mercury in tube 13, thereby closing a circuit from ÷ of battery 47, contact 15, mercury, contact 14, spring 23, contact segment 25, magnets 16 and 41, — of battery 47. Magnet 41 attracts its armature 40$^b$ and arm 39$^d$ is released, whereby spring 38$^b$ is free to swing bell crank lever 38, 38$^c$ in a clockwise direction until arm 39$^b$ is arrested by abutment 42$^a$ on pointer 42, so that pin 36 is pushed down, by rod 37 of the parallel link motion, through a distance determined by the amount of angular motion of arm 39$^b$, which amount is a constant as pointer 42 had been set opposite the index S$t$. Simultaneously, magnet 16 attracts its armature 18$^b$, so that pawl 18$^a$ releases cam 28, and spring 29 swings plate 7 with associate parts in a clockwise direction until rail 27 engages the lower end of pin 36, the position of which, as will be understood, is determined exclusively by the time lapsed between the positions C and B; at the same time cam 44 on plate 7 releases cam 31$^e$ on the arresting lever 31$^a$, 31$^b$, so that the clockwork 30 is again arrested. The tangent of the angle through which plate 7 is so swung is obviously inversely proportional to the said time, i. e. to the distance through which sliding block 33 has travelled from its central position, and the graduations of dial 22 and the index S$t$ on dial 43 are so arranged that said angle is equal to the angle of throw α, see formula I.

When the aeroplane has reached its position A, that is to say when the axis of the telescope makes an angle α with the vertical, contact 14 again closes a circuit from ÷ of battery 47, contact 15, mercury in tube 13, contact 14, contact segment 26, magnet 48, — of battery 47, whereby armature 48$^a$ is attracted and the bomb 48$^d$ released just in the proper moment to hit the target.

If the apparatus is to be used in such a manner that angles γ and β have fixed values, irrespective of the altitude of the aeroplane, I place the reader 21 opposite the index S$t$ on dial 22 and I position pointer 42 so as to indicate the altitude on dial 43, whereupon the apparatus is operated in quite the same manner as hereinbefore described. Dial 43 is graduated in such a way that, when magnet 41 is energized, rod 37 pushes pin 36 down through a distance which is direct proportional to $\sqrt{H}$, so that the tangent of angle α is direct proportional to $\sqrt{H}$ and inversely proportional to the time $t_2$, all in accordance with formula II.

From the above it will be clear that it is immaterial whether or not the target is stationary, seeing that the absolute horizontal speed of the aeroplane is measured by means of the speed of the aeroplane relative to the target.

As to the corrections to be applied, it will be understood that variations in temperature would affect the moment wherein contact 14 is closed by the mercury in tube 13. It is, therefore, necessary to adjust said tube relative to plate 9 and, consequently, to disc 2, which is effected by means of lever 11$^a$, 11$^b$, in accordance with the reading of a thermometer. Dial 45 is empirically graduated in such a manner that, when pointer 45 is placed opposite the figure indicating the temperature, contact 14 is closed exactly the moment wherein, assuming the axis of the telescope to be vertical, rail 27 is in parallel relation with the guideway 34, 35.

It will further be understood that the wind pressure tends to impart to the bomb a relative motion which, as a rule, will be in backward direction. This motion is an accelerated motion, as well as the fall, so that as a rule the projectile will reach the surface of the earth a certain distance behind the target, this distance being direct proportional to the altitude from which the bomb is dropped. The correction to be applied can be approximated as an angle, the magnitude of which depends upon the speed of the aeroplane relative to the air and upon the ballistic features of the bomb, and which can be looked up in the usual ballistic tables. Correction for this wind pressure is effected by means of lever 12$^a$, 12$^b$.

As already stated above, it is essential for the aeroplane to constantly remain in one definite vertical plane through the target during the sighting operation. To this end I attach to bearing 4 two glass tubes 49$^a$ and 49$^b$ (Figs. 4 and 7) in parallel relation with the axis of the telescope, and interconnected both near their tops and their bottoms by tubes 49$^c$ and 49$^d$ at right angles thereto, the tubular system 49$^a$, 49$^b$, 49$^c$, 49$^d$ thus formed being partly filled with mercury. Tubes 49$^a$, 49$^b$ have resistance wires 50 and 51, respectively, lengthwise arranged therein and extending from their bottoms to a certain distance above their tops, where they are interconnected by a resistance 52. Tube 49$^d$ is provided with a contact 53 immersed in the mercury and connected outside the tube with one terminal of a galvanometer 54, the other terminal of which is connected with the middle of resistance 52. The resistance wires 50, 51 are connected to the ÷ and the — pole, respectively, of a battery 55. Wires 50, 51, resistance 52, galvanometer 54 and battery 55 together constitute a Wheatstone bridge, and it will be clear that any angular movement given to the system about pivot 5 will result in a deflection of the pointer of the galvanometer, which indicates "no current" when the axis of the trunnion 3 is horizontal. The galvanometer, therefore, indicates the aviator whether he has to steer to the right or to the left.

What I claim and desire to protect by Letters Patent is:—

1. In automatic bomb dropping apparatus, a sight adapted to oscillate about an axis at right angles to the sight line, a support secured to said sight, gravity controlled means adapted to oscillate about the said axis, a member adapted for rotation about said axis, means tending to swing said member about said axis, a radially extending abutment on said member, a part associated with said member and adapted to cooperate with the gravity controlled means to close an energy circuit, means adapted under the control of said part to successively lock the said member in different angular positions relative to the support, a clockwork, means normally adapted to arrest the clockwork but arranged to be inoperative as long as the said member is locked in one position, an element adapted to be rectilinearly driven at a uniform speed by said clockwork, a piece associated with said element and adapted to be moved relative to said element through a rectilinear path intersecting the path of said abutment, means under the control of said part for moving said piece relative to said element, and bomb releasing means under the control of said part.

2. In automatic bomb dropping apparatus, a sight adapted to oscillate about an axis at right angles to the sight line, a support secured to said sight, gravity controlled means adapted to oscillate about the said axis, a member adapted for rotation about said axis, means tending to swing said member about said axis, a radially extending abutment on said member, a part associated with said member and adapted to cooperate with the gravity controlled means to close an energy circuit, two means angularly adjustable relative to one another and adapted under the control of said part to successively lock the said member in two different angular positions relative to the support, a clockwork, means normally adapted to arrest the clockwork but arranged to be inoperative as long as the said member is locked for the second time, an element adapted to be rectilinearly driven at a uniform speed by said clockwork, a piece associated with said element and adapted to be moved relative to said element through a rectilinear path intersecting the path of said abutment, means under the control of said part for moving said piece relative to said element, and bomb releasing means under the control of said part.

3. In automatic bomb dropping apparatus, a sight adapted to oscillate about an axis at right angles to the sight line, a support secured to said sight, gravity controlled means adapted to oscillate about the said axis, a member adapted for rotation about said axis, means tending to swing said member about said axis, a radially extending abutment on said member, a part associated with said member and adapted to cooperate with the gravity controlled means to close an energy circuit, means adapted under the control of said part to successively lock the said member in different angular positions relative to the support, a clockwork, means normally adapted to arrest the clockwork but arranged to be inoperative as long as the said member is locked in one position, an element adapted to be rectilinearly driven at a uniform speed by said clockwork, a piece associated with said element and adapted to be moved relative to said element through a rectilinear path intersecting the path of a rectilinear path intersecting the path of said abutment, means under the control of said part for moving said piece relative to said element, means for varying the amount of movement imparted to said piece relative to said element, and bomb releasing means under the control of said part.

4. In automatic bomb dropping apparatus, a sight adapted to oscillate about an axis at right angles to the sight line, a support secured to said sight, gravity controlled means adapted to oscillate about the said axis, a member adapted for rotation about said axis, means tending to swing said member about said axis, a radially extending abutment on said member, a part associated with said member and adapted to cooperate with the gravity controlled means to close an energy circuit, means for adjusting the angular relation between said part and said member, means adapted under the control of said part to successively lock the said member in different angular positions relative to the support, a clockwork, means normally adapted to arrest the clockwork but arranged to be inoperative as long as the said member is locked in one position, an element adapted to be rectilinearly driven at a uniform speed by said clockwork, a piece associated with said element and adapted to be moved relative to said element through a rectilinear path intersecting the path of said abutment, means under the control of said part for moving said piece relative to said element, and bomb releasing means under the control of said part.

5. In automatic bomb dropping apparatus, a sight adapted to oscillate about an axis at right angles to the sight line, a support secured to said sight, a circular tube centrally disposed relative to said axis and partly filled with mercury, a member carrying said circular tube and adapted for rotation about said axis, means tending to swing said member about said axis, a radially extending abutment on said member, an electric contact extending partly into and partly outside the circular tube and adapted when engaging the mercury to close an electric circuit, means under the control of said electric contact to successively lock the said member in different angular positions relative to the support, a clockwork, means normally adapted to arrest the clockwork but arranged to be inoperative as long as the said member is locked in one position, an element adapted to be rectilinearly driven at a uniform speed by said clockwork, a piece associated with said element and adapted to be moved relative to said element through a rectilinear path intersecting the path of said abutment, means under the control of said electric contact for moving said piece relative to said element, and bomb releasing means under the control of said electric contact.

6. In automatic bomb dropping apparatus, a sight adapted to oscillate about an axis at right angles to the sight line, a support secured to said sight, gravity controlled means adapted to oscillate about the said axis, a member adapted for rotation about said axis, means tending to swing said member about said axis, a radially extending abutment on said member, a part associated with said member and adapted to cooperate with the gravity controlled means to close an energy circuit, means adapted under the control of said part to successively lock the said member in different angular positions relative to the support, a clockwork, means normally adapted to arrest the clockwork, a cam on the said member adapted to render the said arresting means inoperative as long as the said member is locked in said position, an element adapted to be rectilinearly driven at a uniform speed by said clockwork, a piece associated with said element and adapted to be moved relative to said element through a rectilinear path intersecting the path of said abutment, means under the control of said part for moving said piece relative to said element, and bomb releasing means under the control of said part.

7. In automatic bomb dropping apparatus, a sight adapted to oscillate about an axis at right angles to the sight line, a support secured to said sight, gravity controlled means adapted to oscillate about the said axis, a member adapted for rotation about said axis, means tending to swing said member about said axis, a radially extending abutment on said member, a part associated with said member and adapted to cooperate with the gravity controlled means to close an energy circuit, means adapted under the control of said part to successively lock the said member in different angular positions relative to the support, a clockwork attached to the support and comprising a driving pinion, means normally adapted to arrest the clockwork but arranged to be inoperative as long as the said member is locked in one position, a rack adapted to be driven by said pinion in a direction at right angles to the sight line, a piece movable with said rack and adapted to be displaced at right angles relative thereto in a path intersecting the path of said abutment, spring loaded means normally held in a fixed position relative to the support but adapted to be released under the control of said part to displace the said piece relative to the rack, a stop member for limiting the amount of motion of said spring loaded means, and bomb releasing means under the control of said part.

8. In automatic bomb dropping apparatus, a sight adapted to oscillate about an axis at right angles to the sight line and about a second axis disposed at right angles to the first named axis, means associated with the sight and adapted to indicate oscillations of the first named axis about the second axis, a support secured to said sight, gravity controlled means adapted to oscillate about the said axis, a member adapted for rotation about said axis, means tending to swing said member about said axis, a radially extending abutment on said member, a part associated with said member and adapted to cooperate with the gravity controlled means to close an energy circuit, means adapted under the control of said part to successively lock the said member in different angular positions relative to the support, a clockwork, means normally adapted to arrest the clockwork but arranged to be inoperative as long as the said member is locked in one position, an element adapted to be rectilinearly driven at a uniform speed by said clockwork, a piece associated with said element and adapted to be moved relative to said element through a rectilinear path intersecting the path of said abutment, means under the control of said part for moving said piece relative to said element, and bomb releasing means under the control of said part.

9. In automatic bomb dropping apparatus, a sight adapted to oscillate about an axis at right angles to the sight line and about a second axis disposed at right angles to the first named axis, means associated with the sight and adapted to indicate oscillations of the first named axis about the second axis, a support secured to said sight, a circular tube centrally disposed relative to said axis and partly filled with mercury, a member carrying said circular tube and adapted for rotation about said axis, means tending to swing said member about said axis, a radially extending abutment on said member, an electric contact extending partly into and partly outside the circular tube and adapted when engaging the mercury to close an electric circuit, means under the control of said electric contact to successively lock the said member in different angular positions relative to the support, a clockwork, means normally adapted to arrest the clockwork but arranged to be inoperative as long as the said member is locked in one position, an element adapted to be rectilinearly driven at a uniform speed by said clockwork, a piece associated with said element and adapted to be moved relative to said element through a rectilinear path intersecting the path of said abutment, means under the control of said electric contact for moving said piece relative to said element, and bomb releasing means under the control of said electric contact.

10. In automatic bomb releasing apparatus, a sight adapted to oscillate about an axis at right angles to the sight line, communicating tubes associated with the sight and partly filled with mercury, resistance wires arranged lengthwise in said tubes, a Wheatstone bridge comprising said resistance wires, a support secured to said sight, a circular tube centrally disposed relative to said axis and partly filled with mercury, a member carrying said circular tube and adapted for rotation about said axis, means tending to swing said member about said axis, a radially extending abutment on said member, an electric contact extending partly into and partly outside the circular tube and adapted when engaging the mercury to close an electric circuit, means under the control of said electric contact to successively lock the said member in different angular positions relative to the support, a clockwork, means normally adapted to arrest the clockwork but arranged to be inoperative as long as the said member is locked in one position, an element adapted to be rectilinearly driven at a uniform speed by said clockwork, a piece associated with said element and adapted to be moved relative to said element through a rectilinear path intersecting the path of said abutment, means under the control of said electric contact for moving said piece relative to said element and bomb releasing means under the control of said electric contact.

11. In automatic bomb releasing apparatus, a sight adapted to oscillate about an axis at right angles to the sight line, a support secured to said sight, a circular tube centrally disposed relative to said axis and partly filled with mercury, a member carrying said circular tube and adapted for rotation about said axis, means tending to swing said member about said axis, a radially extending abutment on said member, an electric contact extending partly into and partly outside the circular tube and adapted when engaging the mercury to close an electric circuit, two means angularly adjustable the one relative to the other and under the control of said electric contact to successively lock the said member in two different angular positions relative to the support, a clockwork, means normally adapted to arrest the clockwork but arranged to be inoperative as long as the said member is locked for the second time, an element adapted to be rectilinearly driven at a uniform speed by said clockwork, a piece associated with said element and adapted to be moved relative to said element through a rectilinear path intersecting the path of said abutment, means under the control of said electric contact for moving said piece relative to said element, and bomb releasing means under the control of said electric contact.

12. In automatic bomb dropping apparatus, a sight adapted to oscillate about an axis at right angles to the sight line, a support secured to said sight, a circular tube centrally disposed relative to said axis and partly filled with mercury, a member carrying said circular tube and adapted for rotation about said axis, means tending to swing said member about said axis, a radially extending abutment on said member, an electric contact extending partly into and partly outside the circular tube and adapted when engaging the mercury to close an electric circuit, means for adjusting the angular relation between said electric contact and said member, means under the control of said electric contact to successively lock the said member in different angular positions relative to the support, a clockwork, means normally adapted to arrest the clockwork but arranged to be inoperative as long as the said member is locked in one position, an element adapted to be rectilinearly driven at a uniform speed by said clockwork, a piece associated with said element and adapted to be moved relative to said element through a rectilinear path intersecting the path of said abutment, means under the control of said electric contact for moving said piece relative to said element, and bomb releasing means under the control of said electric contact.

13. In automatic bomb dropping apparatus, a sight adapted to oscillate about an axis at right angles to the sight line, a support secured to said sight, a circular tube centrally disposed relative to said axis and partly filled with mercury, a member carrying said circular tube and adapted for rotation about said axis, means tending to swing said member about said axis, a radially extending abutment on said member, an electric contact extending partly into and partly outside the circular tube and adapted when engaging the mercury to close an electric circuit, two means angularly adjustable the one relative to the other and under the control of said electric contact to successively lock the said member in two different angular positions relative to the support, a clockwork attached to the support and comprising a driving pinion, means normally adapted to arrest the clockwork but arranged to be inoperative as long as the said member is locked for the second time, a rack adapted to be driven by said pinion in a direction at right angles to the sight line, a piece movable with said rack and adapted to be displaced at right angles relative thereto in a path intersecting the path of said abutment, spring loaded means normally held in a fixed position relative to the support but adapted to be released under the control of said electric contact to displace the said piece relative to the rack, an adjustable stop member for limiting the amount of motion of said spring loaded means, and bomb releasing means under the control of said electric contact.

14. In automatic bomb dropping apparatus, a sight adapted to oscillate about an axis at right angles to the sight line and about a second axis disposed at right angles to the first named axis, communicating tubes associated with the sight and partly filled with mercury, resistance wires arranged lengthwise in said tubes, a Wheatstone bridge comprising said resistance wires, a support secured to said sight, a circular tube centrally disposed relative to said axis and partly filled with mercury, a member carrying said circular tube and adapted for rotation about said axis, means tending to swing said member about said axis, a radially extending abutment on said member, an electric contact extending partly into and partly outside the circular tube and adapted when engaging the mercury to close an electric circuit, means for adjusting the angular relation between said electric contact and said member, two means angularly adjustable the one relative to the other and under the control of said electric contact to successively lock the said member in two different angular positions relative to the support, a clockwork attached to the support and comprising a driving pinion, means normally adapted to arrest the clockwork, a cam on the said member adapted to render the said arresting means inoperative as long as the said member is locked in its second position, a rack adapted to be driven by said pinion in a direction at right angles to the sight line, a piece movable with said rack and adapted to be displaced at right angles relative thereto in a path intersecting the path of said abutment, spring loaded means normally held in a fixed position relative to the support but adapted to be released under the control of said electric contact to displace the said piece relative to the rack, an adjustable stop member for limiting the amount of motion of said spring loaded means, and bomb releasing means under the control of said electric contact.

In testimony whereof I affix my signature.

NICOLAAS EVERHARD GROENEVELD MEIJER.